(12) United States Patent
Wu et al.

(10) Patent No.: US 7,478,941 B2
(45) Date of Patent: Jan. 20, 2009

(54) FLICKERLESS LIGHT SOURCE

(75) Inventors: Rong-Yaw Wu, Hsin-Tien (TW); Ai-Lan Hsu, Hsin-Tien (TW)

(73) Assignee: PIXON Technologies Corp., Taipei Hsien (TW)

( * ) Notice: Subject to any disclaimer, the term of this patent is extended or adjusted under 35 U.S.C. 154(b) by 0 days.

(21) Appl. No.: 11/755,080

(22) Filed: May 30, 2007

(65) Prior Publication Data
US 2008/0298080 A1 Dec. 4, 2008

(51) Int. Cl.
*F21V 33/00* (2006.01)

(52) U.S. Cl. .................. 362/612; 362/602; 362/555; 362/84; 362/223

(58) Field of Classification Search .............. 362/602, 362/217–225, 612, 555, 84
See application file for complete search history.

(56) References Cited

U.S. PATENT DOCUMENTS 6,910,783 B2 * 6/2005 Mezei et al. ............. 362/615

2002/0080623 A1 * 6/2002 Pashley et al. ............. 362/555
2002/0131275 A1 * 9/2002 Yamamoto et al. ......... 362/555
2007/0115683 A1 * 5/2007 Park ......................... 362/555

* cited by examiner

*Primary Examiner*—Laura Tso
(74) *Attorney, Agent, or Firm*—Ming Chow; Sinorica, LLC

(57) ABSTRACT

A flickerless light source comprising a transparent or semi-transparent diffuser, a lightpipe with a patterned surface inside the diffuser, and an LED light source attached to each end of the lightpipe is disclosed. The patterned surface of the lightpipe diffuses or reflects light emitted by the LED light sources and through the lightpipe to provide a light with uniform brightness and intensity. The lightpipe is coated with a thin layer of visible-light transparent material which is doped with organic dye molecules. The organic dye has strong ultraviolet light absorption characteristics. By changing the doping concentration of the dye molecules the coating can become total opaque or semi-transparent to certain wavelengths and selective wavelength conversion is obtained. In this way light color, brightness, and intensity can be varied or controlled.

21 Claims, 9 Drawing Sheets

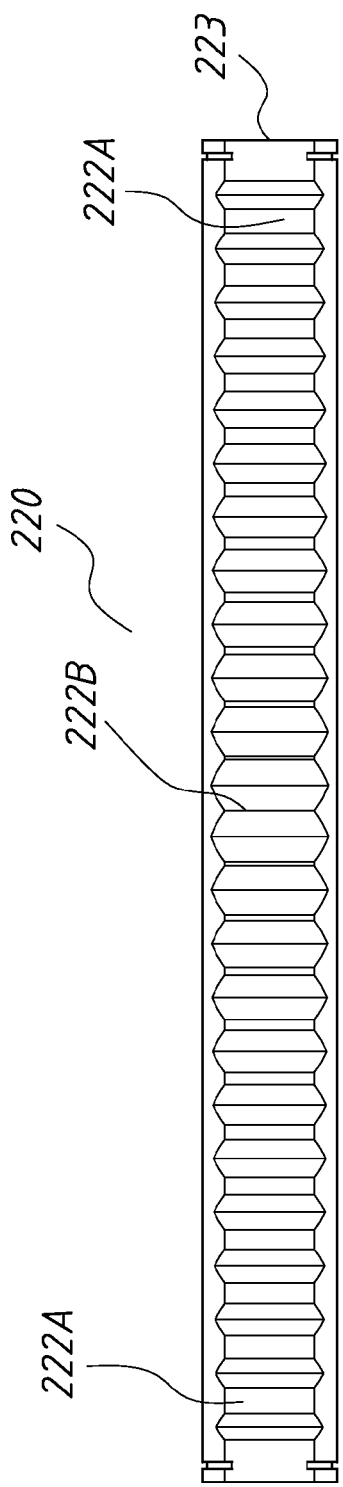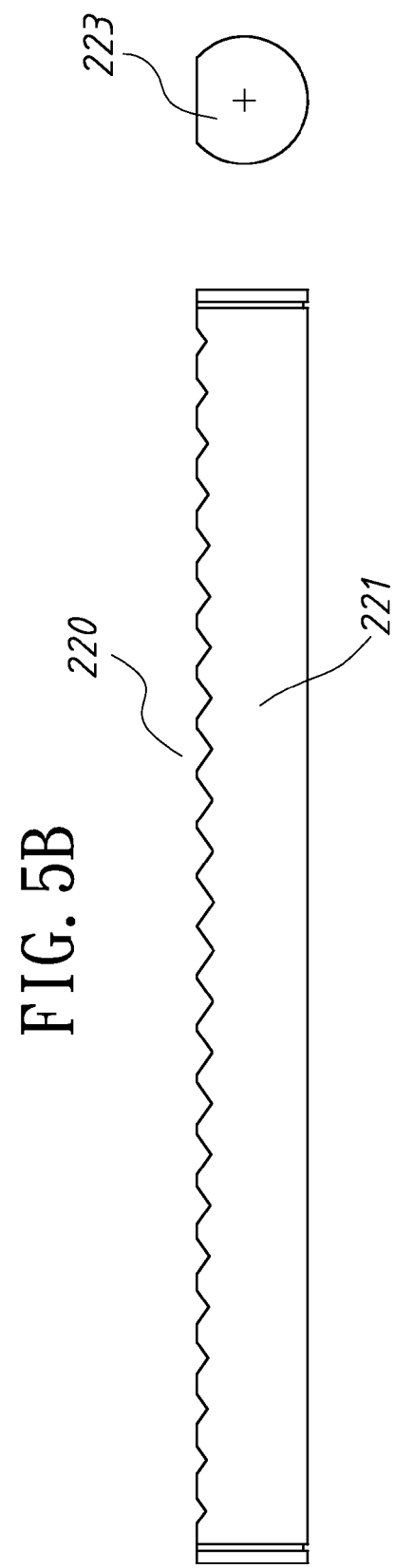
FIG. 5B
FIG. 5C
FIG. 5D

FLICKERLESS LIGHT SOURCE

BACKGROUND OF THE INVENTION

1. Field of the Invention

The present invention relates to a light source. More specifically, the present invention discloses a flicker-less light source that is safe to humans, environmentally friendly, and possesses an extremely long lifetime.

2. Description of the Prior Art

Fluorescent lights are a commonly used light source. In a fluorescent light an electric current stimulates mercury atoms. The stimulation causes the mercury atoms to release ultraviolet photons which stimulate a phosphor. The stimulated phosphor then emits visible light photons.

Refer to FIG. 1, which is a drawing illustrating a conventional fluorescent light installation. As shown in FIG. 1, a conventional fluorescent light installation 100 consists of a sealed glass tube 110 containing a small amount of mercury and inert gas with a phosphor powder coating on the inside of the glass tube 110. An electrode 120 is situated on both ends of the sealed tube 110. A starter 150 allows current to flow to turn on the fluorescent tube 110.

When alternating current 130 is applied electrons migrate through the gas from one end of the tube 110 to the other. As a result the liquid mercury turns into a gas. Collisions between electrons, charged atoms, and mercury atoms cause the electrons to move to a higher energy level. After a short period of time the electrons will return to their original energy level and release light photons.

Electrons in mercury atoms release light photons in the ultraviolet wavelength range which are not visible to humans. In order to convert the ultraviolet light into visible light the phosphor coating is used to release photons of a lower energy.

While fairly effective, the conventional fluorescent light source has numerous disadvantages. One disadvantage is that it can take several seconds for the fluorescent light to start emitting light.

Another disadvantage is that it is difficult to maintain a stable flow of current through the gas which in some cases can cause the light tube to explode or can destroy other components in the circuit.

Refer again to FIG. 1. In order to control the current, a ballast 140 is used to slow down changes in the current by modulating the current at a low cycle rate. Unfortunately, this causes the light to flicker which is annoying and irritating.

Additionally, the ballast 140 can vibrate at a low frequency which is audible to humans and causes further irritation. Workers in environments using fluorescent light have filed complaints of headaches, eye strain, and general eye discomfort.

Furthermore, disposal of fluorescent light systems is problematic since some of the waste is hazardous. For example, some ballasts contain polychlorinated biphenyls (PCBs) or 2-ethylhexyl phathatlate (DEHP) which are carcinogens that can cause liver, skin, and reproductive disorders. Also, fluorescent light tubes contain a small quantity of mercury that can be harmful to the environment and to human health.

In order to properly dispose of the fluorescent light systems special care must be taken and special hazardous waste landfills must be used. This is not only expensive and potentially dangerous but also damaging to the environment.

Therefore, there is need for an improved light source to replace fluorescent light systems that is economical, effective, and safe to humans and the environment.

SUMMARY OF THE INVENTION

To achieve these and other advantages and in order to overcome the disadvantages of the conventional method in accordance with the purpose of the invention as embodied and broadly described herein, the present invention provides a flicker-less and safe light source which is environmentally friendly.

An object of the present invention is to provide a light source to replace the conventional fluorescent light tube. The flicker-less light source of the present invention fits in a conventional light fixture so the light fixture does not need to be replaced in order to use the light source of the present invention. The flicker-less light source of the present invention replaces fluorescent light tube, tungsten lights, and incandescent light bulbs.

The light source of the present invention comprises a diffuser tube, a lightpipe inside the diffuser tube, and a light emitting diode (LED) light source positioned on one end or on each end of the diffuser tube.

Since the light source of the present invention utilizes LED light sources, the emitted light does not flicker and the light source turns on instantly without delay. Once turned on the light source immediately begins emitting a stable visible light. Not only is the light convenient but workers in the environment no longer suffer from discomfort such as headaches or sore eyes.

Additionally, the light source of the present invention does not contain mercury or other harmful materials making disposal of the light source easy and safe for the environment.

Another object of the present invention is to provide a low power light source that uses little electricity and has a long lifetime. This results in major cost savings for consumers.

Another object of the present invention is to provide a light source with selective wavelength conversion. The lightpipe is coated with a thin layer or layers of visible-light transparent material which is doped with organic dye molecules. The organic dye has strong light absorption characteristics in ultraviolet (UV) wavelength and certain short-wavelength visible spectral regions. In this way, the color or color temperature of the light emitted by the light source can be varied or controlled.

As a result, one type of LED light source can produce different light colors, brightness, intensities, or color temperatures. Therefore, manufacturers or suppliers only need to produce or stock one type of LED light source rather than a wide variety of light sources.

Another advantage of the present invention is that the light source of the present invention isn't pressurized. As a result, the light source of the present invention can't explode like a conventional fluorescent light tube.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings:

FIG. 5B is a drawing illustrating a top view of a lightpipe with patterned surface according to an embodiment of the present invention;

FIG. 5C is a drawing illustrating a side view of a lightpipe with patterned surface according to an embodiment of the present invention;

FIG. 5D is a drawing illustrating an end view of a lightpipe with patterned surface according to an embodiment of the present invention;

DESCRIPTION OF THE PREFERRED EMBODIMENTS

Figure 1:
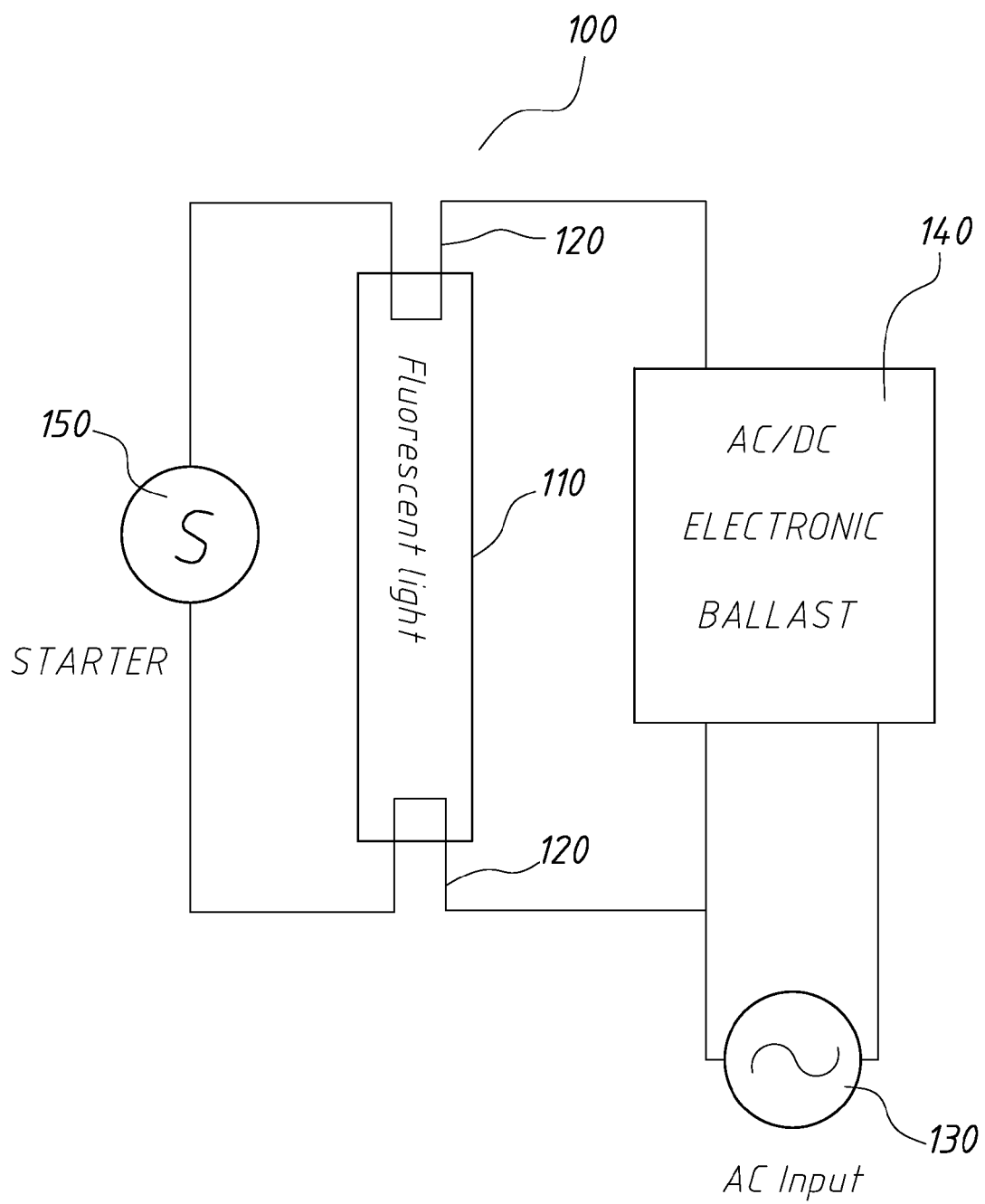
FIG. 1 is a drawing illustrating a conventional fluorescent light installation.

Reference will now be made in detail to the preferred embodiments of the present invention, examples of which are illustrated in the accompanying drawings. Wherever possible, the same reference numbers are used in the drawings and the description to refer to the same or like parts.

Figure 2A:
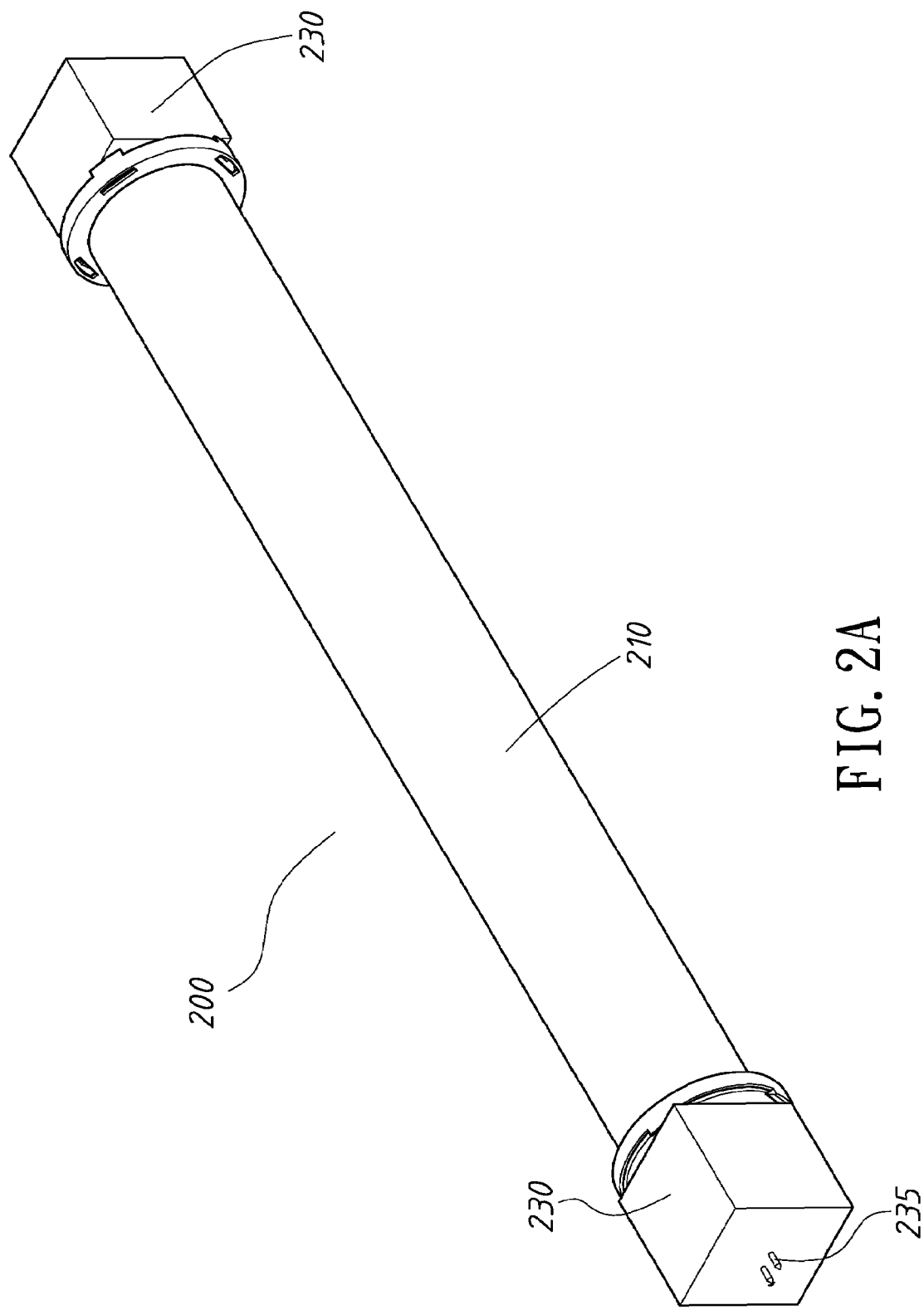
FIG. 2A is a drawing illustrating a flicker-less light source according to an embodiment of the present invention.
Figure 2B:
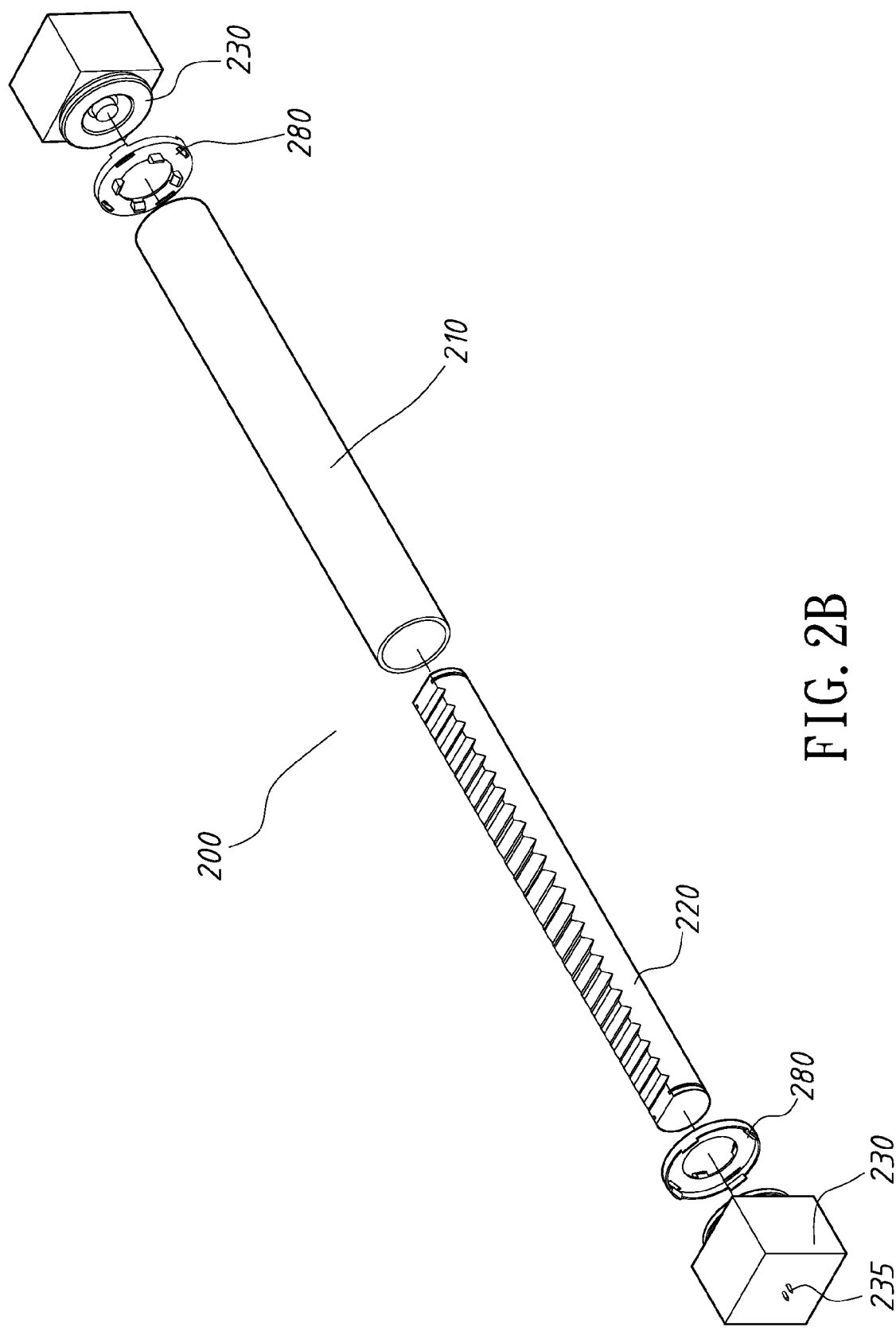
FIG. 2B is a drawing illustrating an exploded view of a flicker-less light source according to an embodiment of the present invention.

Refer to FIG. 2A, which is a drawing illustrating a flicker-less light source according to an embodiment of the present invention, and to FIG. 2B, which is a drawing illustrating an exploded view of a flicker-less light source according to an embodiment of the present invention.

As shown in FIG. 2A and FIG. 2B the flicker-less light source 200 comprises a diffuser tube 210, a lightpipe 220 inside the diffuser tube 210, and two LED light sources 230 one on each end of the diffuser tube 210. Each of the LED light sources 230 comprise electrical connectors 235 for allowing power to be applied to the LED light sources 230. A assembly couplers 280 hold the light source assembly together.

Figure 3:
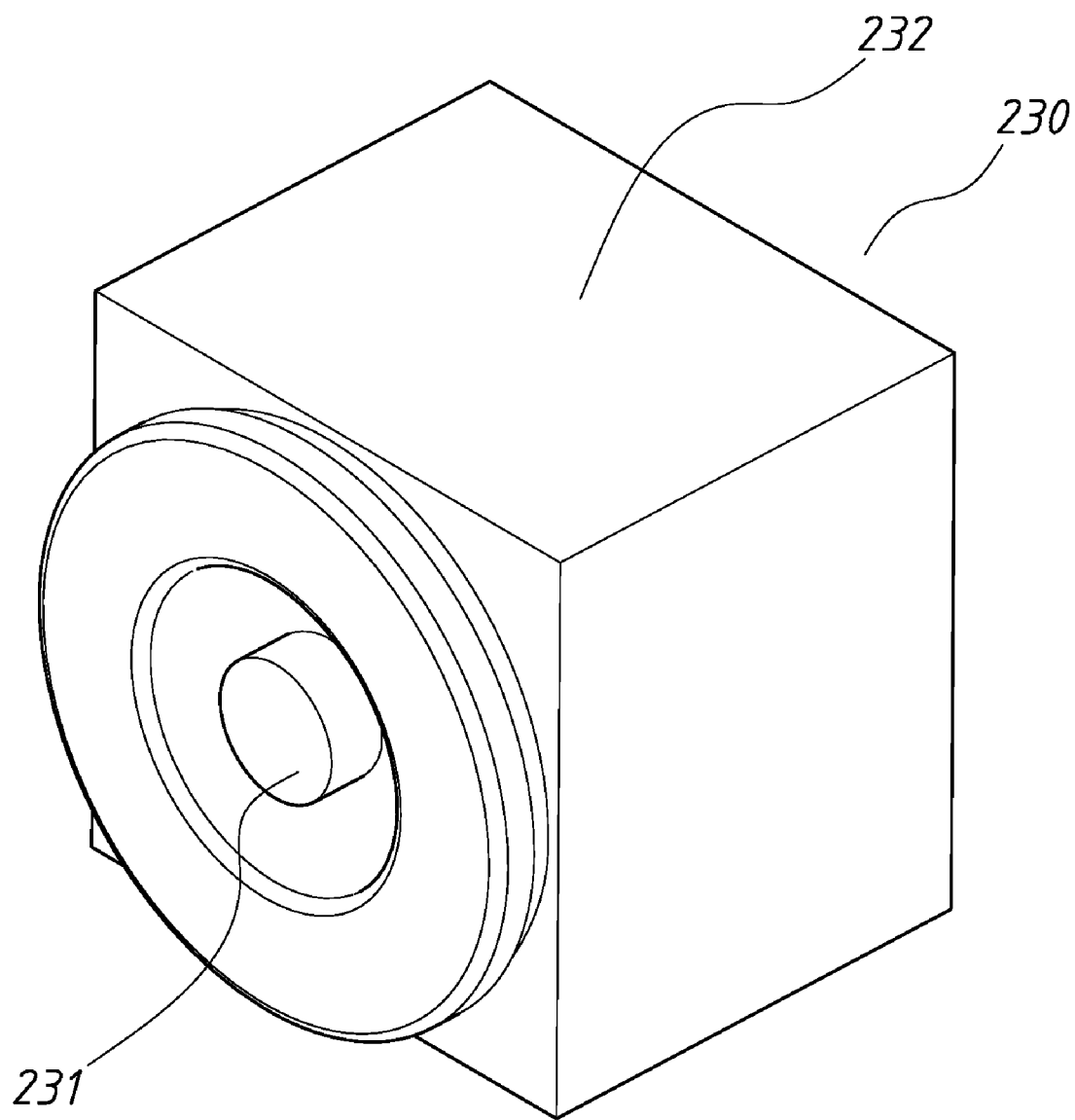
FIG. 3 is a drawing illustrating an LED light source according to an embodiment of the present invention.

Refer to FIG. 3, which is a drawing illustrating an LED light source according to an embodiment of the present invention. Each of the LED light sources 230 comprises at least one LED 231, a housing for holding the LED 232, and an electrical connector 235. In some embodiments of the present invention the LED light source further comprises an AC/DC voltage converter inside a portion of the housing 232.

Figure 4:
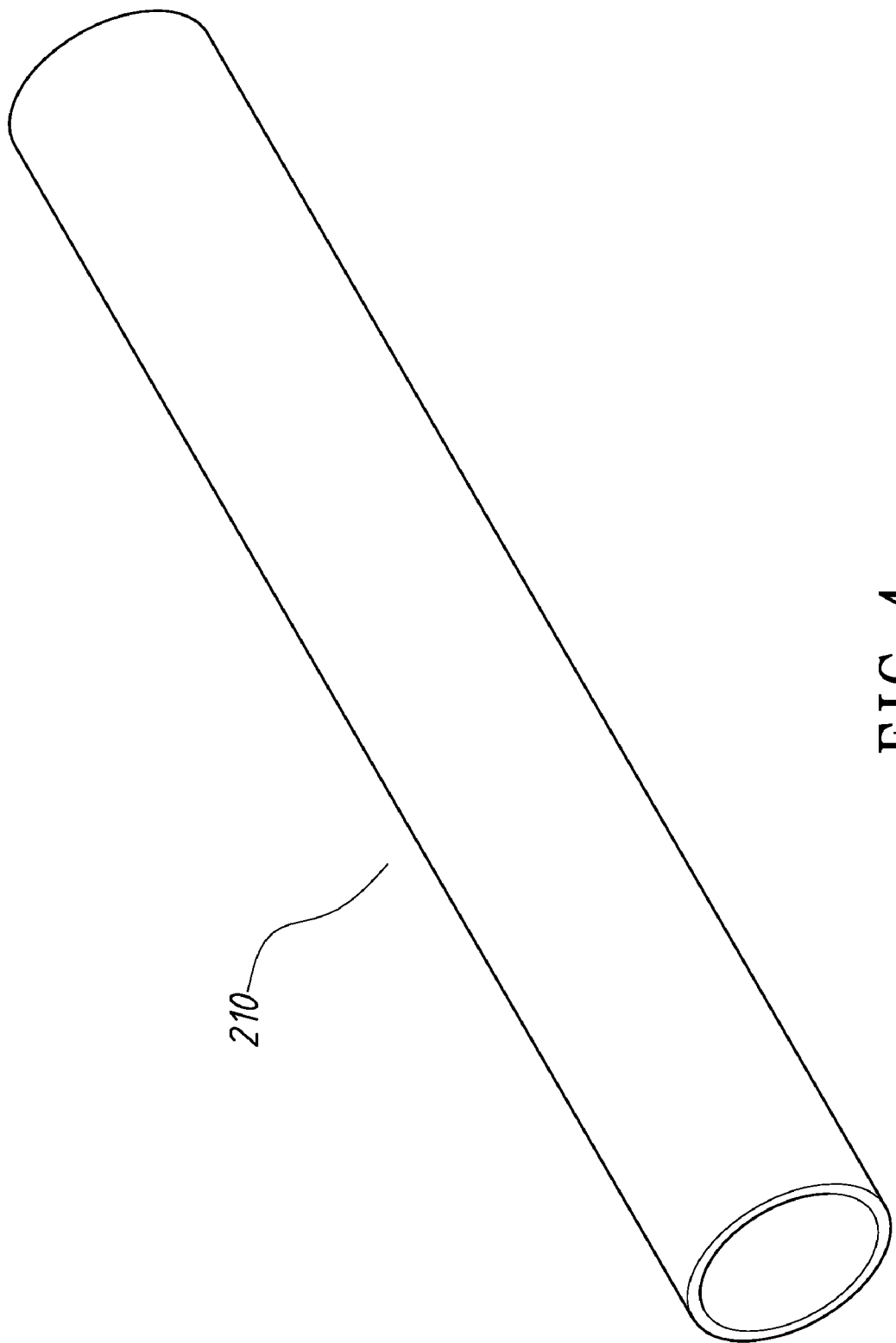
FIG. 4 is a drawing illustrating a diffuser tube of a flicker-less light source according to an embodiment of the present invention.

Refer to FIG. 4, which is a drawing illustrating a diffuser tube of a flicker-less light source according to an embodiment of the present invention. The diffuser tube 210 comprises an elongated hollow tube of transparent, semi-transparent, or colored material. The material comprises, for example, plastic, acrylic, butyrate, polycarbonate, PETG, ETFE, or other material with suitable properties.

The diffuser tube 210 acts as a housing around the lightpipe. In embodiments of the present invention where the diffuser tube 210 comprises semitransparent material the diffuser tube 210 diffuses the light emitted from the LED light sources through the lightpipe. In embodiments of the present invention where the diffuser tube 210 comprises colored material the diffuser tube 210 further affects the light's color.

In an embodiment of the present invention the LED light source attaches to the diffuser tube 210. In another embodiment of the present invention the LED light source attaches to the diffuser tube 210 and the lightpipe.

Figure 5A:
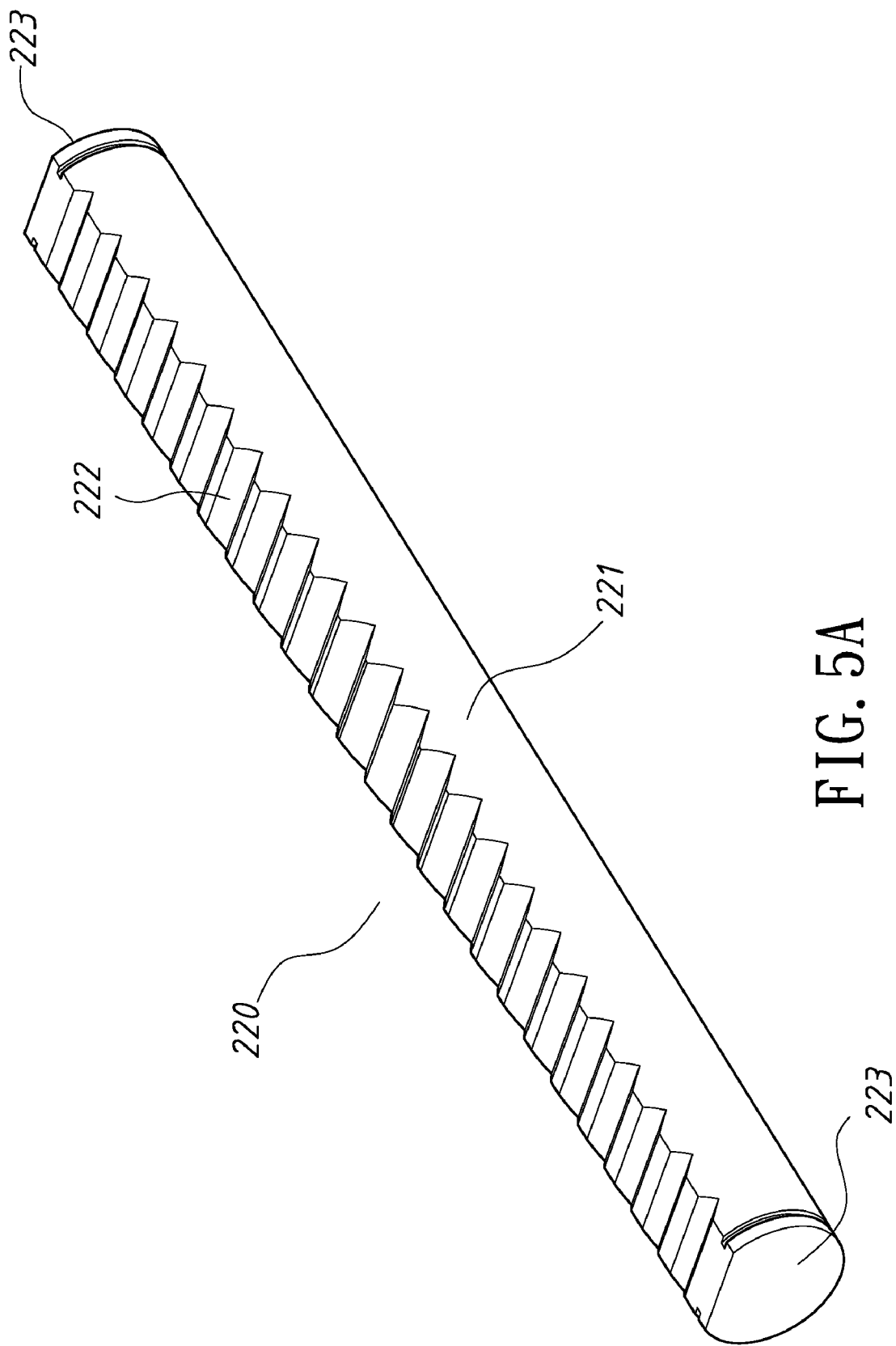
FIG. 5A is a drawing illustrating a lightpipe of a flicker-less light source according to an embodiment of the present invention.

Refer to FIG. 5A, which is a drawing illustrating a lightpipe of a flicker-less light source according to an embodiment of the present invention. As shown in FIG. 5A, the lightpipe 220 comprises an elongated bar of transparent or semi-transparent material. The lightpipe 220 comprises a substantially smooth surface 221, two end surfaces 223, and a patterned surface 222. In some embodiments of the present invention the patterned surface 222 is a light reflecting surface. In some embodiments of the present invention the patterned surface 222 is a light diffusing surface.

The patterned surface 222 comprises a plurality of notches, indentations, dimples, curves, or other patterns to reflect, diffuse, or spread light emitted by the LED light sources that travels from the end surfaces 223 through the lightpipe 220. The pattern on the patterned surface 222 allows the light emitted by the flicker-less light source to have a uniform quality and intensity throughout the length of the light source.

In application, power is supplied to the LED light sources via the electrical connectors. The LEDs in the LED light sources turn on and emit light into the lightpipe through the end surfaces of the lightpipe. The light travels through the lightpipe and is emitted from the patterned surface of the lightpipe or reflected by the patterned surface of the lightpipe and emitted from the smooth surface of the lightpipe.

Refer to FIG. 5B, which is a drawing illustrating a top view of a lightpipe with light diffusing surface according to an embodiment of the present invention, to FIG. 5C, which is a drawing illustrating a side view of a lightpipe with light diffusing surface according to an embodiment of the present invention, and to FIG. 5D, which is a drawing illustrating an end view of a lightpipe with light diffusing surface according to an embodiment of the present invention.

As shown in FIG. 5B, FIG. 5C, and FIG. 5D the patterned surface 222 of the lightpipe 220 comprises a pattern to reflect or diffuse light. In the embodiment illustrated in FIGS. 5B and 5C the pattern comprises a series of notches that are shallow indentations 222A on the ends of the lightpipe 220 and gradually increase in depth to become peaked notches 222B in the middle of the lightpipe 220. The pattern of the patterned surface 222 in this embodiment provides an optimal pattern to uniformly diffuse or reflect the light. Since the ends 223 of the lightpipe 220 are closer to the LED light sources more diffusion or reflection is needed. Further away from the LED light sources less diffusion or reflection is needed.

In other embodiments of the present invention other types of patterns for the patterned surface are used. For example, in an embodiment of the present invention only one LED light source is used. Therefore, the pattern comprises a gradually increasing notch depth from the end of the lightpipe nearest the LED light source to the end of the lightpipe the farthest away from the LED light source.

In another embodiment of the present invention, the pattern comprises elevated peaks that extend above the surface of the lightpipe. Unlike embodiments of the present invention comprising a pattern indented into the surface of the lightpipe, in this embodiment the pattern extends above the other surface of the lightpipe.

In another embodiment of the present invention the pattern on the patterned surface comprises a plurality of round dimples. Towards the end or ends of the lightpipe the dimples are small and increase in size towards the middle of the lightpipe. In another embodiment of the present invention the dimples vary in depth.

Figure 6:
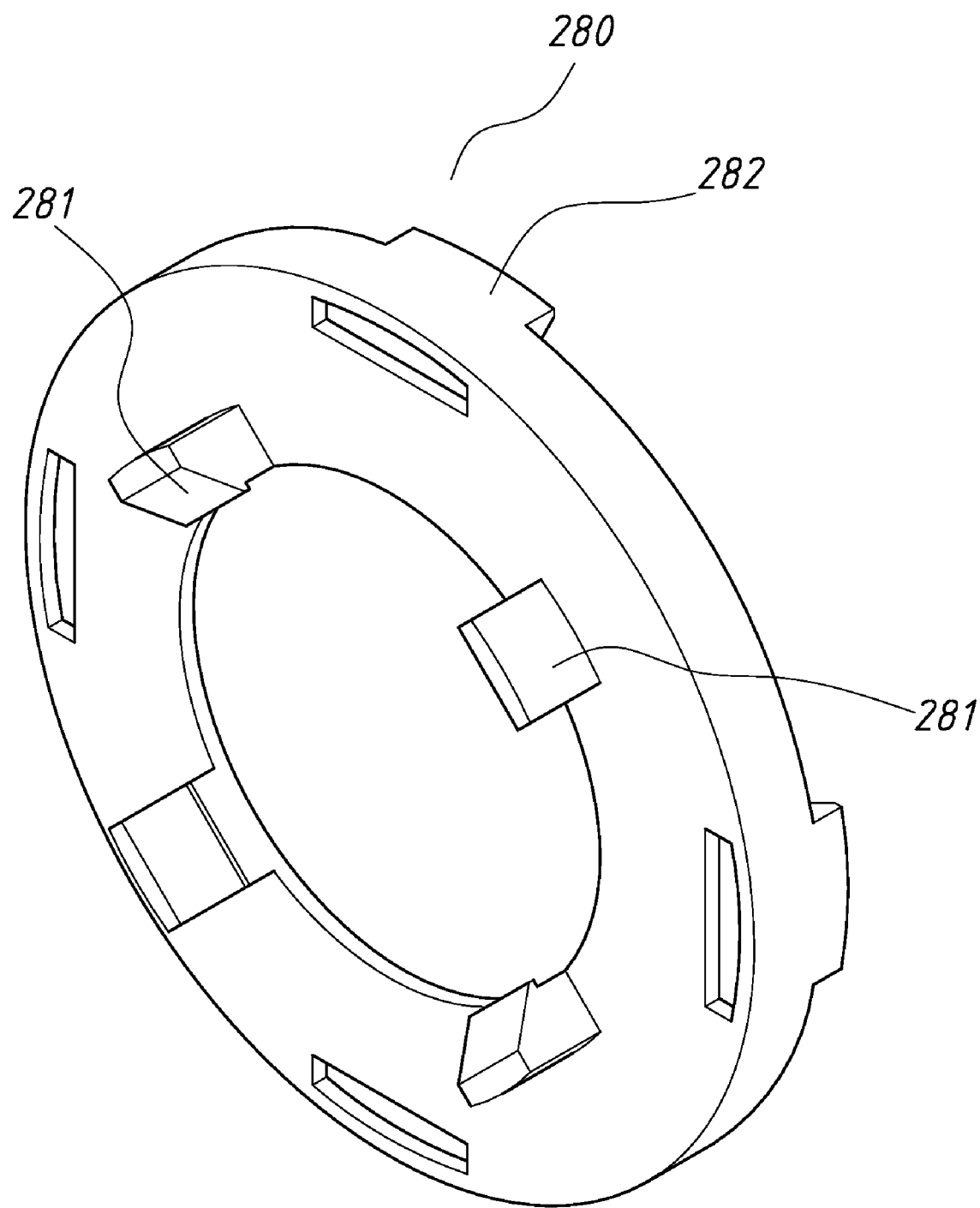
FIG. 6 is a drawing illustrating an assembly coupler according to an embodiment of the present invention.

Refer to FIG. 6, which is a drawing illustrating an assembly coupler according to an embodiment of the present invention.

In order to hold the light source assembly together, in some embodiments of the present invention an assembly coupler 280 is utilized. The assembly coupler 280 comprises a plurality of lightpipe tabs 281 and a plurality of LED light source tabs 282. When assembled the lightpipe is gripped by the inside of the lightpipe tabs 281 and the LED light sources are gripped by the LED light source tabs. The diffuser tube fits snuggly to the outer wall of the lightpipe tabs 281. While gripping the lightpipe the assembly coupler positions the lightpipe in the center of the diffuser tube and away from the walls of the diffuser tube.

In other embodiments of the present invention other means are used to hold the light source assembly together. For example, in an embodiment of the present invention the housing of the LED light source comprises a circular flange for holding the lightpipe and an extending wall for snuggly attaching to the diffuser tube.

Figure 7:
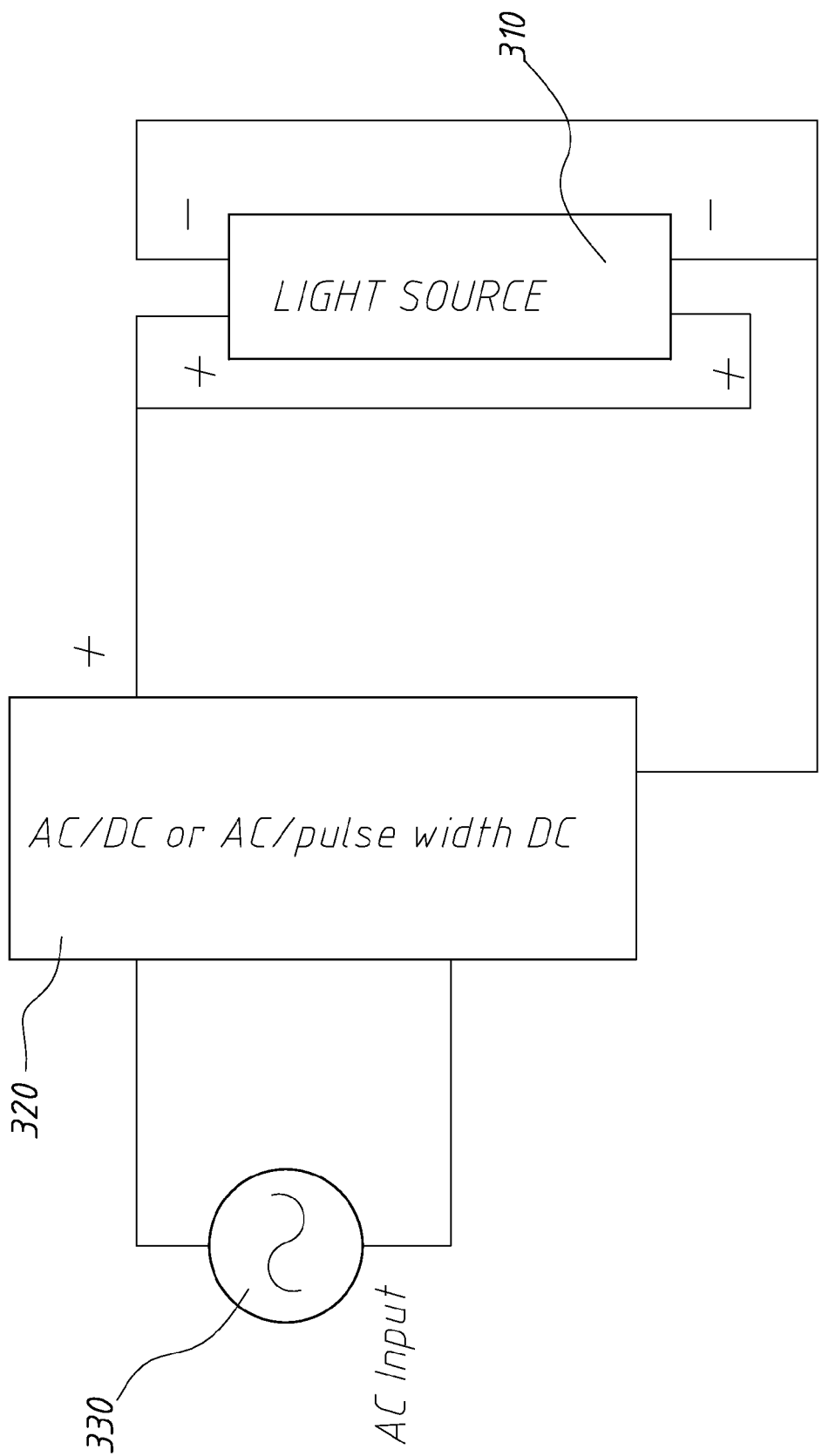
FIG. 7 is a drawing illustrating a light source of the present invention installed in a conventional fluorescent light fixture.

Refer to FIG. 7, which is a drawing illustrating a light source of the present invention installed in a conventional fluorescent light fixture.

As shown in FIG. 7, the flicker-less light source 310 of the present invention can be installed in a conventional light fixture. In this embodiment an AC/DC converter 320 converts the alternating current supplied by the power source 330 into direct current. The direct current is applied to the electrical connectors of the light source and the light source 310 turns on.

The present invention also provides a light source with selective wavelength conversion. The lightpipe is coated with a thin layer or layers of visible-light transparent material which is doped with organic dye molecules. The organic dye has strong light absorption characteristics in ultraviolet (UV) wavelength and certain short-wavelength visible spectral regions.

When the coated thin film is irradiated or pumped with light at theses wavelengths ($\lambda_1$) through the lightpipe, the electrons in the dye molecules jump from the ground state to the excited states at higher energy levels. The dye molecules decay from the excited state to the ground state occurs predominantly through radiative decay. Consequently, the dye molecules radiate very effectively at somewhat longer wavelengths ($\lambda_2$) than the pump wavelengths ($\lambda_1$).

By changing the doping concentration of the dye molecules in the thin film the coated thin film can become total opaque or semi-transparent to the pump wavelengths ($\lambda_1$). In the case of total opaque, the light emitted from the lightpipe through coated thin film will be only at wavelength $\lambda_2$. In the latter case (semi-transparent) the light emitted from the lightpipe through coated thin film will be a combination spectra of $\lambda_1+\lambda_2$.

As a result, one type of LED light source can produce different light colors, brightness, or intensities. Therefore, manufacturers or suppliers only need to produce or stock one type of LED light source rather than a wide variety of light sources.

For example, if a blue LED light source is used, the doped coating or doped lightpipe can produce a yellow light to be emitted. In order to down-convert, the light source must be a higher energy color. For example, using blue which has higher energy as a light source and green red in the doping since it has lower energy in order to achieve the down-conversion.

In an embodiment of the present invention the outside surface of the lightpipe is doped to provide the selected wavelength conversion.

In another embodiment of the present invention the lightpipe material is doped throughout the material.

In an embodiment of the present invention LED light sources of different colors are used. By changing the doping of the coating a uniform light is emitted.

In an embodiment of the present invention a plurality of LEDs are used in each LED light sources. This provides flexibility in achieving desired light intensity or brightness.

In an embodiment of the present invention each LED light source comprises a blue LED, a red LED, and a green LED.

In an embodiment of the present invention the lightpipe is coated with a reflective coating. The reflective coating further enhances the efficiency of the light source by preventing light from escaping or being emitted from portions of the lightpipe.

In an embodiment of the present invention the power is not consistently applied. As a result the LED is not always on. Since LEDs have a fast response time the LED can be switched on and off in order to save power. In this embodiment the LED is switched on and off at a frequency that is undetectable by the human eye. For example, with an adequate pulse width modulation cycle time function added, the light source turns on and off at a high enough rate no be undetectable while saving power. In an embodiment of the present invention the electrical connector of the LED light source is compatible with a conventional incandescent light bulb fixture. In this embodiment the lightpipe and the diffuser covering the lightpipe cooperate to emit a uniform light. This embodiment provides an effective replacement for the conventional incandescent light bulb. The long lifetime and low power usage of the light source of the present invention far surpasses that of the common light bulb making it more practical and economical.

In an embodiment of the present invention the power supplied to the light source is DC power, for example, from a battery. This allows the light source to be portable or used in locations such as vehicles where DC power is available. In this embodiment an AC/DC converter is not necessary.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

The invention claimed is:

1. A light source comprising:
 a diffuser;
 a lightpipe inside said diffuser; said lightpipe comprising a smooth surface and a patterned surface for diffusing or reflecting light; and
 at least one light emitting diode light source attached to each end of said lightpipe;
 wherein said patterned surface comprises a series of notches that are shallow indentations on the ends of said lightpipe and gradually increase in depth to become peaked notches in the middle of said lightpipe.

2. The light source of claim 1, the light emitting diode light source comprising:
   - at least one light emitting diode;
   - a housing for holding the at least one light emitting diode; and
   - an electrical connector for allowing power to be applied to the at least one light emitting diode from a power source.

3. The light source of claim 1, the lightpipe comprising a coating of visible-light transparent material doped with organic dye molecules.

4. The light source of claim 1, the lightpipe comprising an organic dye coating with ultraviolet light absorption characteristics.

5. The light source of claim 1, the lightpipe comprising a coating for selective wavelength conversion.

6. The light source of claim 5, the coating comprising a visible-light transparent material doped with organic dye molecules.

7. A light source comprising:
   - a diffuser;
   - a lightpipe inside said diffuser, wherein said lightpipe comprising a smooth surface and a patterned surface for diffusing or reflecting light; and
   - at least one light emitting diode light source attached to said lightpipe;
     - where said patterned surface comprises a series of notches gradually increasing in notch depth farther away from an end of said lightpipe nearest said at least one light emitting diode light source.

8. The light source of claim 7, where one light emitting diode light source is attached to each end of said lightpipe.

9. The light source of claim 7, the light emitting diode light source comprising:
   - at least one light emitting diode;
   - a housing for holding the at least one light emitting diode; and
   - an electrical connector for allowing power to be applied to the at least one light emitting diode from a power source.

10. The light source of claim 7, the lightpipe comprising a coating of visible-light transparent material doped with organic dye molecules.

11. The light source of claim 7, the lightpipe comprising an organic dye coating with ultraviolet light absorption characteristics.

12. The light source of claim 7, the lightpipe comprising a coating for selective wavelength conversion.

13. The light source of claim 12, the coating comprising a visible-light transparent material doped with organic dye molecules.

14. A light source comprising:
   - a hollow diffuser tube;
   - a lightpipe inside said hollow diffuser tube, said lightpipe comprising a smooth surface and a patterned surface for diffusing or reflecting light; and
   - a light emitting diode light source attached to an end of said lightpipe;
     - wherein said patterned surface comprises a series of notches gradually increasing in notch depth from an end of said lightpipe nearest said light emitting diode light source to an end of said lightpipe farthest away from said light emitting diode light source.

15. The light source of claim 14, the light emitting diode light source comprising:
   - at least one light emitting diode;
   - a housing for holding the at least one light emitting diode; and
   - an electrical connector for providing power to the at least one light emitting diode from a power source.

16. The light source of claim 14, the lightpipe comprising a coating of visible-light transparent material doped with organic dye molecules.

17. The light source of claim 14, the lightpipe comprising an organic dye coating with ultraviolet light absorption characteristics.

18. The light source of claim 17, the coating comprising a visible-light transparent material doped with organic dye molecules.

19. A light source comprising:
   - a lightpipe comprising a smooth surface and a patterned surface for diffusing or reflecting light; and
   - a light emitting diode light source attached to the lightpipe;
     - wherein said patterned surface comprises a series of notches gradually increasing in notch depth farther away from the light emitting diode light source.

20. The light source of claim 19, the light emitting diode light source further comprising:
   - an electrical connector for allowing power to be applied to the light emitting diode light source from a power source.

21. The light source of claim 20, the electrical connector shaped to match a socket of a conventional incandescent or fluorescent light fixture.

* * * * *